(12) United States Patent
Günther et al.

(10) Patent No.: US 10,525,624 B2
(45) Date of Patent: Jan. 7, 2020

(54) HEATING ELEMENT FOR A FLOW CHANNEL OR A MOULD IMPRESSION AND INJECTION-MOULDING NOZZLE WITH SUCH A HEATING ELEMENT

(71) Applicant: GÜNTHER Heisskanaltechnik GmbH, Frankenberg (DE)

(72) Inventors: Herbert Günther, Allendorf (DE); Siegrid Sommer, Burgwald (DE); Torsten Schnell, Lichtenfels (DE); Ralf Drössler, Frankenberg (DE); Marco Kwiatkowski, Burgwald/Ernsthausen (DE)

(73) Assignee: GÜNTHER HEISSKANALTECHNIK GMBH, Frankenberg (DE)

( * ) Notice: Subject to any disclaimer, the term of this patent is extended or adjusted under 35 U.S.C. 154(b) by 343 days.

(21) Appl. No.: 15/223,481

(22) Filed: Jul. 29, 2016

(65) Prior Publication Data

US 2017/0036383 A1 Feb. 9, 2017

(30) Foreign Application Priority Data

Aug. 3, 2015 (DE) .......................... 10 2015 112 748

(51) Int. Cl.
*B29C 45/74* (2006.01)
*B29C 45/20* (2006.01)
(Continued)

(52) U.S. Cl.
CPC .............. *B29C 45/74* (2013.01); *B29C 45/20* (2013.01); *B29K 2105/0067* (2013.01)

(58) Field of Classification Search
None
See application file for complete search history.

(56) References Cited

U.S. PATENT DOCUMENTS

| 4,403,405 A | 9/1983 | Gellert |
| 4,486,650 A | 12/1984 | Bridgstock et al. |

(Continued)

FOREIGN PATENT DOCUMENTS

| DE | 19941038 A1 | 3/2001 |
| DE | 102006049667 A1 | 4/2008 |

(Continued)

OTHER PUBLICATIONS

Foreign Communication from a related counterpart application—Search Report of European Application No. 16181346.4 dated Oct. 26, 2016, 7 pages.

*Primary Examiner* — Jacob T Minskey
*Assistant Examiner* — Baileigh Kate Darnell
(74) *Attorney, Agent, or Firm* — Conley Rose, P.C.; Keith C. Rawlins

(57) ABSTRACT

A heating element for flow channel heating or for heating a mould impression and an injection-moulding nozzle incorporating the heating element are disclosed. The heating element has a carrier element which carries a heating conductor with first and second connection pins, and a connection device with an electrical connection cable with first and second conductors. The first and second connection pins end in an insulator. The insulator is arranged at least in certain portions in a receiving sleeve of the connection device, and the receiving sleeve points with a first end in the direction of the carrier element, is fixed with the first end on the carrier element and fixes the insulator in relation to the carrier element. A first crimping sleeve is fixed on the first connection pin and the first conductor, and a second crimping sleeve is fixed on the second connection pin and the second conductor.

12 Claims, 4 Drawing Sheets

(51) Int. Cl.
    *H05B 3/08*     (2006.01)
    *H05B 3/46*     (2006.01)
    *B29K 105/00*     (2006.01)

(56) References Cited

U.S. PATENT DOCUMENTS

| | | | | |
|---|---|---|---|---|
| 4,771,534 | A * | 9/1988 | Gellert | B23P 15/007 |
| | | | | 174/76 |
| 5,235,737 | A | 8/1993 | Gellert | |
| 5,437,093 | A * | 8/1995 | Gellert | B23P 15/007 |
| | | | | 164/108 |
| 5,507,635 | A * | 4/1996 | Gellert | B29C 45/27 |
| | | | | 264/328.15 |
| 6,323,465 | B1 * | 11/2001 | Gellert | B29C 45/2737 |
| | | | | 219/421 |
| 7,034,258 | B2 * | 4/2006 | Sutorius | B29C 45/2737 |
| | | | | 219/535 |
| 8,137,097 | B2 * | 3/2012 | Gunther | B29C 45/1782 |
| | | | | 264/328.15 |
| 2002/0166855 | A1 * | 11/2002 | Renwick | F04B 39/06 |
| | | | | 219/544 |
| 2003/0218006 | A1 | 11/2003 | Sutorius | |
| 2007/0149049 | A1 | 6/2007 | Feick et al. | |
| 2013/0216644 | A1 * | 8/2013 | Sommer | B29C 45/74 |
| | | | | 425/549 |

FOREIGN PATENT DOCUMENTS

| | | |
|---|---|---|
| DE | 102006049669 A1 | 4/2008 |
| DE | 102008004526 A1 | 4/2009 |
| DE | 102008015376 A1 | 9/2009 |
| DE | 102012101400 A1 | 9/2013 |
| WO | 2005053361 A2 | 6/2005 |

* cited by examiner

HEATING ELEMENT FOR A FLOW CHANNEL OR A MOULD IMPRESSION AND INJECTION-MOULDING NOZZLE WITH SUCH A HEATING ELEMENT

CROSS-REFERENCE TO RELATED APPLICATIONS

This application claims priority to German Patent Application No. 10 2015 112 748.2, filed Aug. 3, 2015, entitled "Heating Element for a Flow Channel or a Mould Impression and Injection-Moulding Nozzle with Such a Heating Element," which is incorporated by reference herein in its entirety.

FIELD OF INVENTION

The invention relates to a heating element for heating a flow channel or a mould impression and to an injection-moulding nozzle with such a heating element.

BACKGROUND

A flow channel, in particular a hot runner, is used in injection-moulding technology for feeding a flowable compound—for example a polymer melt—at a predeterminable temperature and under high pressure into a mould impression of a moulding tool (for example a mould plate). A special portion of a flow channel may be formed by an injection-moulding nozzle. These usually comprise a material tube with a flow channel which ends in a nozzle mouthpiece. The latter forms at the end a nozzle outlet opening, which opens out into the mould impression by way of a gate.

In order that the flowable compound does not cool down prematurely within the hot runner or flow channel, electrical heating elements with heating conductors are used. Their electrical conductors can be led out from the injection-moulding tool, which comprises the flow channel and the moulding tool, by way of cables. In this case, the connections to the heating elements are exposed to high temperatures and strong shocks and vibrations. This applies in particular to heating elements that are arranged on the outside of the material tube of an injection-moulding nozzle. Usually, not much free installation space is available in this area. In a particular configuration, the heating elements have a sleeve-shaped carrier element and an electrical conductor, which generates heat when an electrical voltage is applied or an electrical current flows through.

The same problems arise during the heating of a mould impression. Here, too, the heating element that is possibly applied to a portion of the wall or incorporated in the wall of the mould impression is exposed to strong shocks and vibrations, whereby the connections of the heating element are subjected to corresponding loads. In addition to this, space is usually confined, making it more difficult to provide a permanently reliable electrical connection.

The electrical conductor may—as disclosed for example in DE 10 2006 049 669 A1—be a heating coil formed from resistance wire. U.S. Pat. No. 4,486,650 A discloses in combination with a heating coil for example a releasable plug-in connection between the connection ends of the heating coil and the connection line of a power supply.

In the following, a thick-film heating on a cylindrical carrier element is taken as a basis by way of example. The invention is not restricted to this, however, but can also be applied in the same way to other types and forms of heating elements.

DE 10 2006 049 667 A1 uses so-called thick-film heating elements applied as heating conductor paths to a sleeve as a carrier element by the screen printing process. Optionally provided between the carrier element and the electrical conductor is an insulating layer, which is likewise applied by the screen printing process as a thick film. To keep the overall size of the heating element particularly small, the carrier element may—as described in DE 199 41 038 A1—also be directly the material tube of an injection-moulding nozzle.

In order to supply the thick-film heating with energy, a connection contact is respectively provided at the ends of the heating conductor path, for example in the form of a pigtail or a connection pin (see in this respect WO 2005/053361 A2, DE 10 2008 004 526 A1 or DE 10 2008 015 376 A1). By way of the connection contact, the heating conductor path is connected to the connection line of a power source.

DE 10 2012 101 400 A1 also discloses an injection-moulding nozzle with an electrical heating element which comprises a connection device for producing an electrical connection to a connection line, wherein connection contacts of the heating element end in an insulator of the connection device that electrically separates the connection contacts from one another. The connection line has contact elements, which can be brought into electrical contact with the connection contacts of the heating element, wherein the insulator is arranged at least in certain portions in a receiving sleeve of the connection device. The connection line has here at the end a plug or a coupling, which can be releasably fixed in or on the receiving sleeve in such a way that the contact elements of the connection line electrically contact the connection contacts of the heating element. A first end of the receiving sleeve, pointing in the direction of the heating element, reaches around the insulator. At this first end, the receiving sleeve also has two feet pointing outwards opposite from one another and fastened to the heating element.

A disadvantage of this configuration is that the connection as a whole has a great overall height, reaching up from the heating element. Installation space for this is required in the injection-moulding tool. The arrangement of flow channels and further injection-moulding nozzles in this installation space is consequently ruled out. Similarly, the forming of the mould impression is restricted. It is also problematic that the relatively high construction forms a relatively long lever arm, which transfers tension on the cable to the connection device and can destroy it.

SUMMARY OF INVENTION

The object of the invention is therefore to provide a heating element for a flow channel or a mould impression and also an injection-moulding nozzle with such a heating element, wherein the heating element has a compact connection device. In this case, the connection device should establish a constantly sufficient and reliable electrical contact between the connection contacts of the heating conductor paths and the connection line connected to the power source. On account of the high temperatures prevailing during the injection moulding, it must be temperature-resistant and withstand mechanical tensile loads that may occur during the fitting and removal of the injection-moulding nozzle and/or during the exchange of the heating element and also as a result of vibrations and shocks.

Features of the invention are specified in the independent claims. The dependent claims relate to refinements.

The invention relates to a heating element for heating a flow channel or a mould impression, in particular a hot runner, that has a carrier element, which carries a heating conductor with a first connection pin and a second connection pin, and that comprises a connection device with an electrical connection cable with a first and a second conductor, wherein the first and second connection pins end in an insulator of the connection device that separates the first connection pin electrically from the second connection pin, wherein the insulator is arranged at least in certain portions in a receiving sleeve of the connection device, and wherein the receiving sleeve points with a first end in the direction of the carrier element, is fixed with the first end on the carrier element and fixes the insulator in relation to the carrier element, wherein a first crimping sleeve is fixed on the first connection pin and a second crimping sleeve is fixed on the second connection pin, in each case by plastic deformation, and the first crimping sleeve is fixed on the first conductor and the second crimping sleeve is fixed on the second conductor, in each case by plastic deformation.

The advantage of such a configuration is that, in comparison with a plug-in connection, the overall height of which can be reduced to a minimum of about 33 mm, a reduction of the overall height or the projection above the carrier element to 19 mm or even less is accomplished. The connection between the receiving sleeve and the carrier element leads to a stable connection and the electrical conductors and connection pins are protected well from external loads within the insulator. A constantly sufficient and reliable electrical contact is established between the connection contacts of the heating conductor paths and the connection line connected to the power source. This connection even withstands high temperatures and also vibrations and shocks.

According to an optional configuration, it is provided that the receiving sleeve has a second end, which is opposite from the first end, forms a third crimping sleeve and is fixed on the connection cable by plastic deformation. This forms an anti-tension device, which fixes the connection cable. This has the effect of reducing the risk of the crimped connections or the connection pins being subjected to loading by tensile forces. In particular, a tension-resistant connection of the cable jacket to the carrier element is formed as a result by way of the receiving sleeve.

In an embodiment, the carrier element is formed as a tube or sleeve. It is consequently suitable in particular for heating a fluid flowing through. This fluid may either flow directly through the carrier element or the carrier element is fitted or pushed onto a tube. In particular, a carrier element configured in such a way can be fitted onto a material tube of an injection-moulding nozzle for producing plastic parts.

Increased strength of the connection is achieved if the insulator stands with a resting surface of an adapted form on the carrier element. In the case of a configuration of the carrier element in the form of a tube or sleeve, in particular a concave resting surface, in particular a partly cylindrical resting surface, is ideal.

In a more specific configuration, the first end of the receiving sleeve reaches around the insulator and has at this first end two feet pointing outwards opposite from one another and fastened to the carrier element.

The feet make a stable connection to the carrier element possible and provide good support against tilting moments for an otherwise slender connection. The feet are fastened to the carrier element with a material bond; in particular, the feet and the carrier element should consist of metal and be welded to one another.

Furthermore, the feet should be formed as one part, in particular monolithically, on and with respect to the receiving sleeve. In this way, a high strength is achieved between the feet and the receiving sleeve.

According to a variant, the feet are respectively fixed on the receiving sleeve by a leg portion and are respectively fastened to the carrier element by a resting portion resting on the carrier element.

A particularly advantageous embodiment provides that the feet are adapted to the outer contour of the insulator such that they follow the outer contour, in particular in each case with the leg portion. Consequently, they secure the insulator well and the connection device is very compact.

The connection device is suitable for variants in which the heating conductor is applied to the carrier element by film technology. In these areas, the contact points at the transition to the contact pins are particularly sensitive to tensile and compressive loads. According to the invention, these loads can be prevented to the greatest extent. An electrically conducting thick film proves to be particularly good as the heating conductor. Such an electrically conducting thick film that is arranged on a first insulating layer applied to the carrier element by film technology, in particular by the thick-film technique, is preferred. Consequently, the carrier element may consist of electrically conducting material, in particular of a metal. It is appropriate to cover the electrically conducting thick film with a second insulating layer, applied by film technology, in particular by the thick-film technique. Consequently, the electrical conductors are encapsulated and protected. For the direct fastening of the feet to the carrier element, the first insulating layer and/or the second insulating layer should have a clearance in the region of the feet.

Furthermore, the receiving sleeve can consist of metal. Metal is heat resistant and can absorb tensile forces well. Furthermore, it can be plastically deformed well, and consequently crimped. The carrier element also can consist of metal.

According to one aspect, the insulator has a neck portion and a base portion, wherein the receiving sleeve is supported on the base portion of the insulator. Consequently, the connection device is only wider, and stably supported, in the region of the carrier element. Further away from the carrier element, on the other hand, it is slender. Furthermore, a stable form fit is produced between the receiving sleeve and the insulator.

To increase safety, it is provided according to an additional feature that an earthing conductor of the connection cable is connected in an electrically conducting manner to the receiving sleeve. When the incoming or outgoing electrical line or the heating conductor path is in contact with the receiving sleeve, the current can then be carried away by way of the earthing cable.

An appropriate configuration for avoiding electrical contact is one in which the insulator has two through-holes, wherein one of the first and second crimping sleeves is arranged in each through-hole.

Particularly good tension relief of the connection pin can be achieved by a special design, according to which the through-holes are respectively formed by a first, a second and a third portion, which have at least two different diameters. In particular, the first portion should be arranged on the side of the carrier element and have a greater diameter than the second portion, which lies between the first portion and the third portion, wherein the third portion has a greater diameter than the second portion, wherein the plastic deformations of the crimping sleeves in the region of the connection pins lie within the first portion, a middle region of the crimping sleeves without plastic deformation is arranged in the region of the second portion, and the plastic deformations of the crimping sleeves in the region of the conductors lie within the third portion. In this way, a form fit can form between the insulator and the crimping sleeves. For this purpose, the diameter of the second portion should be less than the diameter of the crimping sleeves in the region of the plastic deformations. It is favourable here if the diameter of the second portion substantially corresponds to the diameter of the crimping sleeves in the non-plastically-deformed region. Suitable for commonly used heating outputs in injection-moulding technology are for example diameters of 1.6±0.10 mm for the first and third portions and of 1.15+0.10/−0.05 mm for the second portion. A crimping sleeve with a diameter of 1.00 mm may be used here by way of example.

Furthermore, the first and second crimping sleeves should respectively have a cylindrical outer lateral surface. With such crimping sleeves, a minimal diameter, and consequently a compact connection device, are provided. The first and second crimping sleeves can have at least on the side towards the conductors in each case an inner bevel. This makes it easier for the conductors to be inserted.

For assembly reasons, the insulator can be formed in two parts, comprising a standing element, which stands on the carrier element, and a head element, which is positioned adjacent to the standing element on the side opposite from the carrier element. Consequently, a form fit on both sides with the crimping sleeves is made possible. For this purpose, the first portion and the second portion should be formed in the standing element. The third portion should be formed in the head element. Consequently, the standing element can be pushed over the crimping sleeves after the crimping of the crimping sleeves on the connection pins. It is appropriate if the connection pins terminate substantially or exactly flush with the standing element. During assembly, the still free end of the crimping sleeves then still protrudes out from the standing element and can be crimped with the electrical conductors. The head element is subsequently pushed from the conductors onto the crimping sleeves and towards the standing element.

In order to separate the electrical conductors from one another, the insulator should terminate with the crimping sleeves or protrude beyond them, in particular transversely in relation to the longitudinal direction.

According to a configuration of the heating element, the receiving sleeve consists of a first and a second sleeve portion, which are welded to one another, wherein the first sleeve portion forms the first end of the receiving sleeve. In other words, the first sleeve portion fixes the insulator, at least the standing element thereof, on the carrier element. Consequently, the connection pins can be well protected before the electrical conductors are connected to the crimping sleeves and exert tensile forces and leverages on the connection pins by hanging down in an uncontrolled manner. The two sleeve portions are connected by laser welding. In particular, the second sleeve portion may first be pushed onto the conductors or the connection cable until the first and second crimping sleeves are deformed. Subsequently, the second sleeve portion may be pushed towards the first sleeve portion and connected to it.

In an embodiment, the second sleeve portion is pushed into the first sleeve portion. Optionally a peripheral welding groove into which the welding seam is subsequently placed can be formed between the first and second sleeve portions. Such a groove can have a triangular cross section. Convenient assembly and welding are made possible, along with a high-quality appearance.

If the receiving sleeve is of a two-part form, this makes it possible to lead out an earthing conductor of the connection cable between the two sleeve portions and fix it, in particular by lasering, in an electrically conducting manner on the outer side of one of the sleeve portions. This is particularly easy and inexpensive.

Optionally, one or two further connection contacts with contact pins that are electrically connected to a thermocouple are arranged in the insulator. Not only thermocouples in the form of wires, but also thermocouples produced by thick-film technology are suitable. For thermocouples in the form of wires, the receiving sleeve may optionally have a fastening means. This is then situated on the outer side of the receiving sleeve.

The invention also relates to an injection-moulding nozzle with a flow channel, in particular a hot runner, in a material tube, and with a heating element described above, which for heating the flow channel is thermally coupled to the material tube. Such an injection-moulding nozzle consequently has a stable electrical connection and is particularly compact. As a result, it is suitable for particularly small distances between gating points that are arranged in a mould plate and into which the material tube opens out.

The injection-moulding nozzle may have a housing enclosing the heating element. This protects the heating element. Incorporated in the housing can be a lateral clearance, which is formed as open in the longitudinal direction of the flow channel, wherein the receiving sleeve protrudes through the lateral clearance. This makes (dis)assembly easy.

BRIEF DESCRIPTION OF THE DRAWINGS

Further features, details and advantages of the invention emerge from the wording of the claims and from the following description of exemplary embodiments on the basis of the drawings, in which:

DETAILED DESCRIPTION

Figure 1:
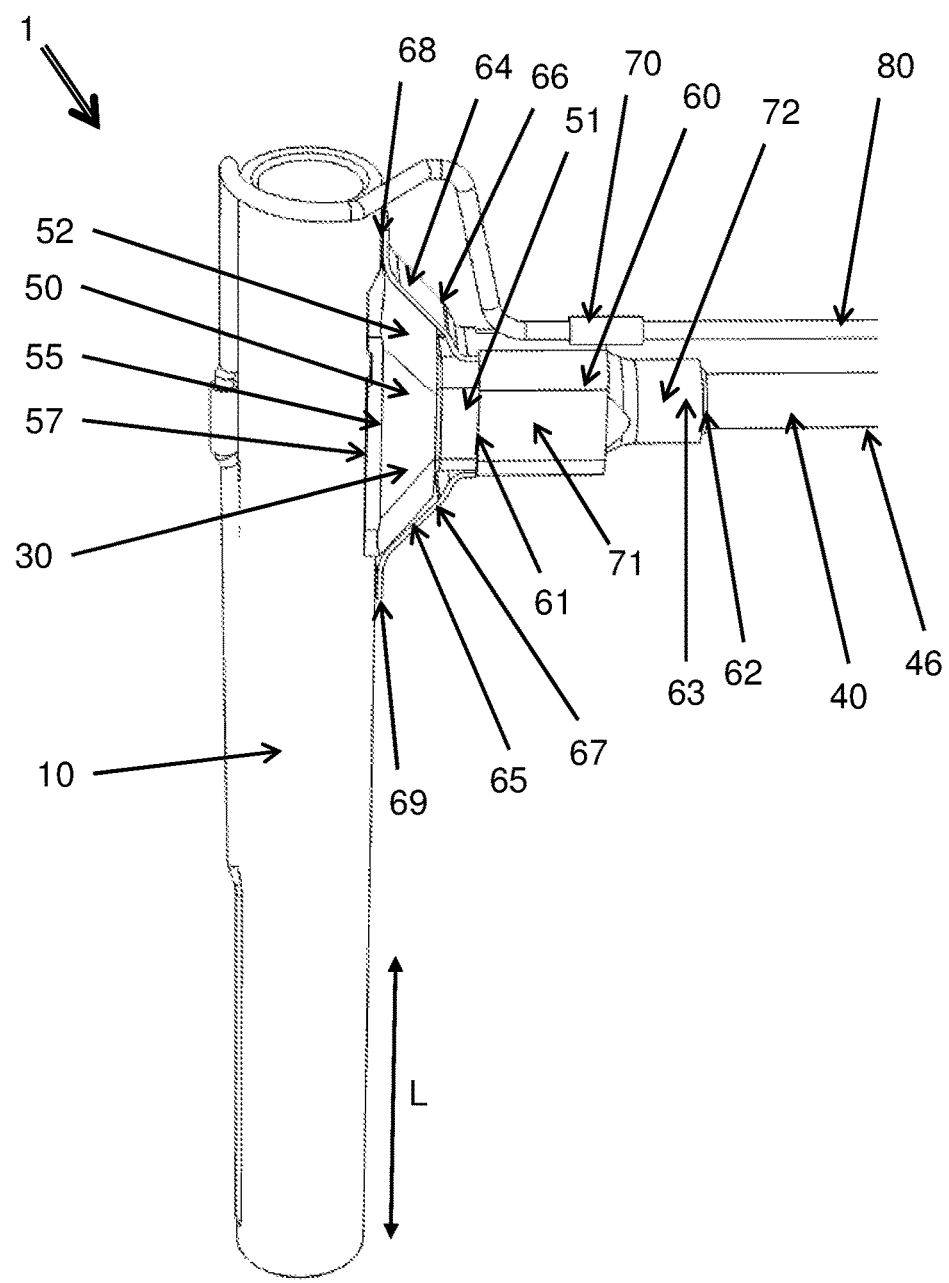
FIG. 1 shows a perspective view of a heating element.

FIG. 1 shows a perspective view of a heating element 1 for heating a flow channel in a hot runner nozzle, which is for example a component part of a hot runner mould. The heating element 1 has a tubular carrier element 10, which carries a heating conductor 20 with a first connection pin 21 and a second connection pin 22. It also has a connection device 30 with an electrical connection cable 40 with a first and a second conductor 41, 42, wherein the first and second connection pins 21, 22 end in an insulator 50 of the connection device 30.

The insulator 50 is arranged in certain portions in a receiving sleeve 60 of the connection device 30. It has in this case a neck portion 51 and a base portion 52, wherein the receiving sleeve 60 is supported on the base portion 52 of the insulator 50.

The receiving sleeve 60 points with a first end 61 in the direction of the carrier element 10, is fixed with this first end 61 on the carrier element 10 and fixes the insulator 50 in relation to the carrier element 10. For this purpose, the first end 61 of the receiving sleeve 60 reaches around the insulator 50. Furthermore, the receiving sleeve 60 has at this first end 61 two feet 64, 65 pointing outwards opposite from one another and fastened to the carrier element 10. The two feet 64, 65 point oppositely in the longitudinal direction L of the tubular carrier element 10 and are fastened with a material bond on the carrier element 10, in particular are welded on or laser-welded. For this, the receiving sleeve 60 and the carrier element 10 respectively consist of a metal.

It can be seen that the feet 64, 65 are formed monolithically in one part with the receiving sleeve 60. The feet 64, 65 are respectively divided into a leg portion 66, 67, which is fixed on the receiving sleeve 60, and a resting portion 68, 69, which rests on the carrier element 10 and is fastened to the carrier element 10. It can also be seen how the feet 64, 65, in particular their leg portions 66, 67, are adapted to the outer contour of the insulator 50 such that they follow the outer contour.

A second end 62, opposite from the first end 61, is formed as a third crimping sleeve 63 and is fixed on the connection cable 40, in particular its protective jacket 46, by plastic deformation. The receiving sleeve 60 therefore extends with the second end 62 beyond the insulator 50.

For assembly reasons, the receiving sleeve 60 is formed by a first and a second sleeve portion 71, 72, which are welded to one another, wherein the first sleeve portion 71 forms the first end 61 of the receiving sleeve 60 and the second sleeve portion 72 forms the third crimping sleeve 63.

A fastening means 70 can also be seen on the outer side of the receiving sleeve 60, on which a thermocouple 80 is fixed. In particular, the fastening means 70 is an insertion opening, through which the thermocouple is inserted.

It can be seen from the abutting surface 57 of the insulator 50 lying closely against the carrier element 10 that it is adapted in its form to the tube shape of the carrier element 10.

Figure 2:
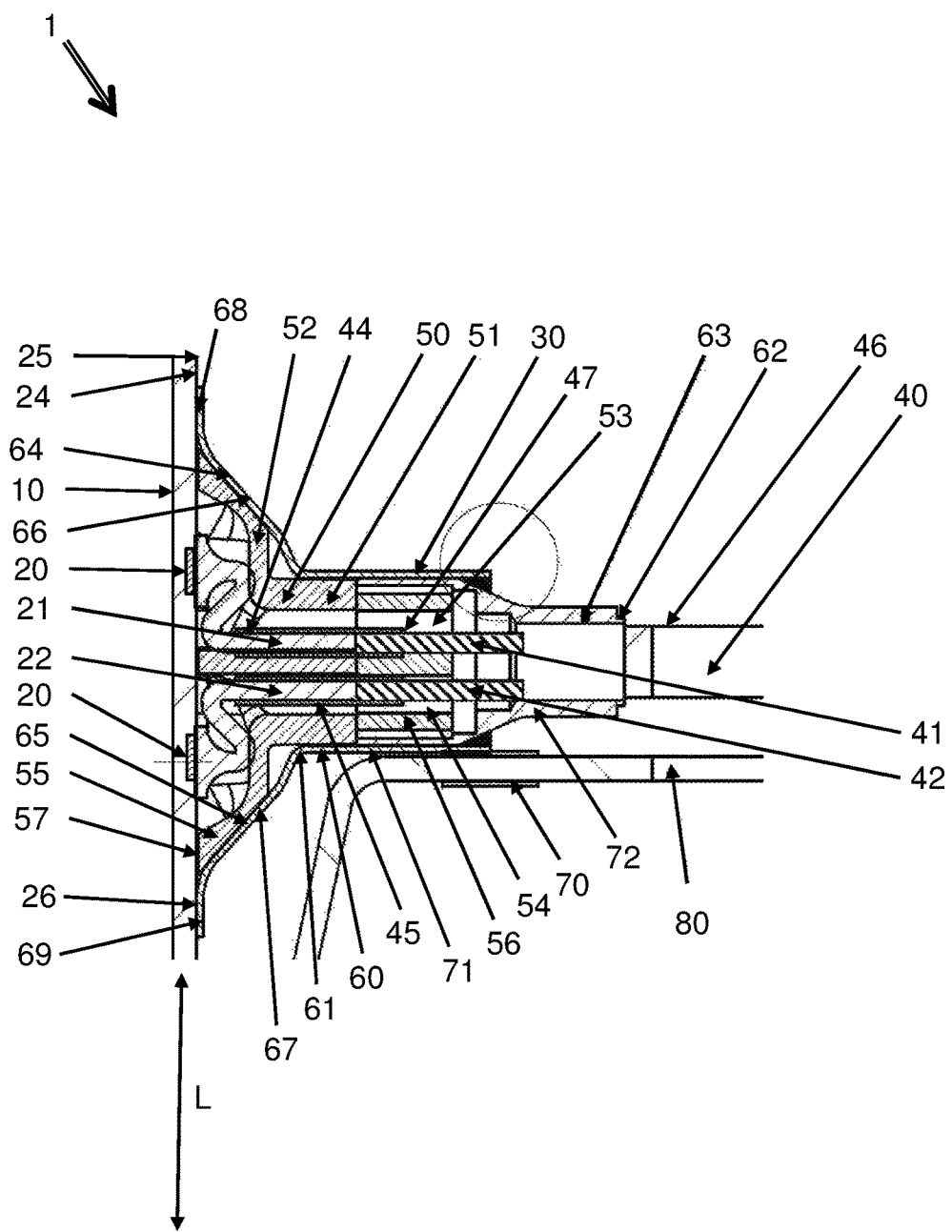
FIG. 2 shows a section through a connection device of a heating element.

FIG. 2 shows a section through a connection device 30 of a heating element 1. The description relating to FIG. 1 also applies to the representation shown in FIG. 2. Therefore, only the features that can be additionally seen are described hereafter.

For instance, in the section shown in FIG. 2 there can be seen a heating conductor 20, which is formed by an electrically conducting thick film 23. This lies on a first insulating layer 24, which is applied to the carrier element 10 by the thick-film technique and is covered with a second insulating layer 25, applied by the thick-film technique. However, the first insulating layer 24 and the second insulating layer 25 have a clearance 26 in the region of the feet 64, 65.

The heating conductor 20 has a first connection pin 21 and a second connection pin 22. These respectively have a relieving loop or bow and protrude perpendicularly from the carrier element 10. The first and second connection pins 21, 22 end in the insulator 50, which separates the first connection pin 21 electrically from the second connection pin 22. A first crimping sleeve 44 is fixed on the first connection pin 21 and a second crimping sleeve 45 is fixed on the second connection pin 22, in each case by plastic deformation.

Furthermore, the electrical connection cable 40 has a first and a second conductor 41, 42. The first crimping sleeve 44 is fixed on the first conductor 41 and the second crimping sleeve 45 is fixed on the second conductor 42, in each case by plastic deformation. The insulator 50 has two through-holes 53, 54, wherein one of the first and second crimping sleeves 44, 45 is arranged in each through-hole 53, 54. The first and second crimping sleeves 44, 45 respectively have a cylindrical outer and inner lateral surface, at least before they are deformed. The first and second crimping sleeves 44, 45 also have at least on the side towards the conductors 41, 42 an inner bevel 47.

It can also be seen that the insulator 50 is formed in two parts, comprising a standing element 55, which stands on the carrier element 10, and a head element 56, which is positioned adjacent to the standing element 55 on the side opposite from the carrier element 10. The connection pins 21, 22 terminate flush with the standing element 55.

In this way, during assembly the head element 56 can first be pushed onto the electrical conductors 41, 42, while the standing element 55 is already fixed with the first sleeve portion 71 on the carrier element 10. As soon as the conductors 41, 42 are connected to the first and second crimping sleeves 44, 45, the head element 56 is then pushed towards the standing element 55. The insulator 50 then protrudes in particular with the head element 56 beyond the first and second crimping sleeves 44, 45.

The second sleeve portion 72 may likewise first be pushed onto the conductors 41, 42, or the connection cable 40, until the first and second crimping sleeves 44, 45 are deformed. Subsequently, the second sleeve portion 72 may then be pushed towards the first sleeve portion 71 and connected to it. It then also fixes the head element 56 of the insulator 50.

Figure 3:
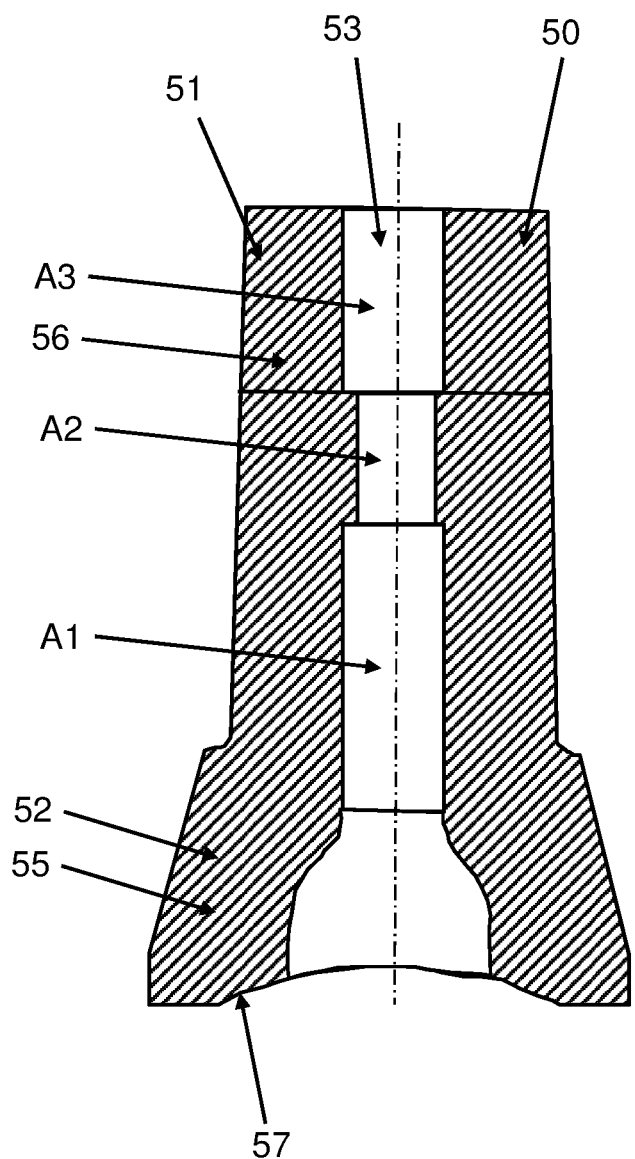
FIG. 3 shows a longitudinal section through an insulator.

In FIG. 3, a longitudinal section through an insulator 50 can be seen. In the longitudinal section there lies a through-hole 53, which is made up of a first, a second and a third portion A1, A2, A3. The portions A1, A2, A3 have two different diameters. The first portion A1, which is later arranged on the side of the carrier element 10, in particular with a resting surface 57, has a greater diameter than the second portion A2. The second portion A2 is arranged between the first and third portions A1, A3. In this case, the third portion A3 has a greater diameter than the second portion A2. In particular, the first and third portions A1, A3 have a diameter of the same size.

In this way it is possible that the plastic deformations of the crimping sleeves on sides of the connection pins lie within the first portion A1, a middle region of the crimping sleeves without plastic deformation is arranged in the region of the second portion A2, and the plastic deformations of the crimping sleeves in the region of the conductors lie within the third portion A3. A stable connection is produced if the diameter of the second portion A2 is less than the diameter of the crimping sleeves in the region of the plastic deformations. For this purpose, the diameter of the second portion A2 should substantially correspond to the diameter of the crimping sleeves in the non-plastically-deformed region.

To allow the whole thing to be assembled, the insulator 50 is made up of a standing element 55, which forms a base portion 52 with the resting surface 57, and a head element 56, which forms a neck portion 51. The standing element 55 carries the first and second portions A1, A2. It can be pushed on when the crimping sleeves have been connected to the connection pins. Subsequently, the crimping sleeves can be connected to connection conductors outside the standing element 55, before the head element is pushed over the deformation of the crimping sleeve.

Suitable for commonly used heating outputs in injection-moulding technology are for example diameters of 1.6±0.10 mm for the first and third portions and of 1.15+0.10/−0.05 mm for the second portion. A crimping sleeve with a diameter of 1.00 mm may be used here by way of example.

Figure 4:
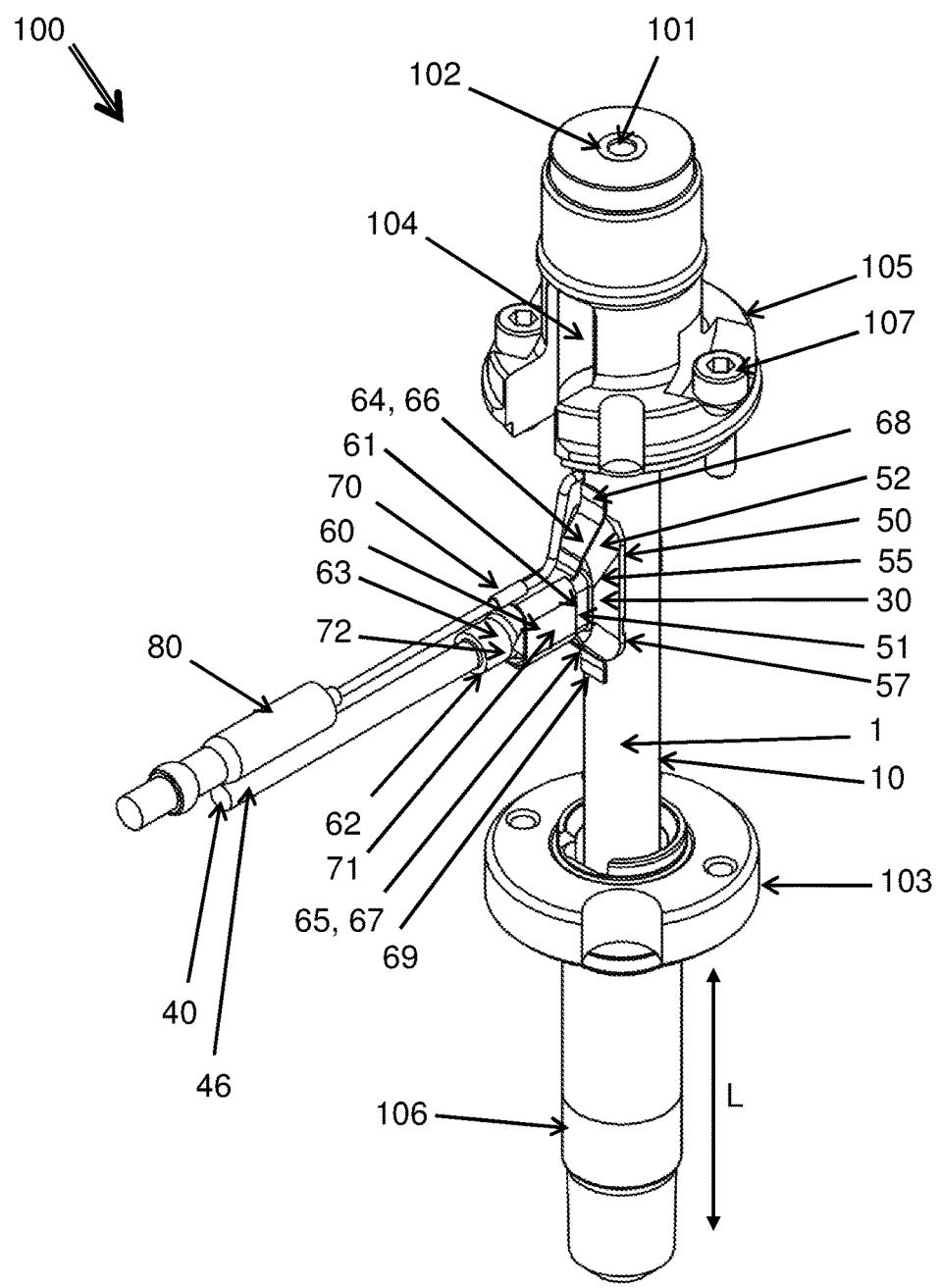
FIG. 4 shows a perspective exploded representation of an injection-moulding nozzle with a heating element.

FIG. 4 shows a perspective exploded representation of an injection-moulding nozzle 100 with a heating element 1. In particular, the heating element 100 is technically constructed in a way corresponding to the representation in FIG. 1. Therefore, with regard to the description of the heating element, reference is made to the foregoing description.

The sleeve-shaped heating element 1 has been pushed onto a material tube 102 of the injection-moulding nozzle, which extends in the direction of the longitudinal axis L. As a result, the heating element 1 is thermally coupled to the material tube 102 for the heating of the flow channel 101. In an embodiment, a loose fit is formed between the material tube 102 and the sleeve-shaped heating element 1 at room temperature. At operating temperature of the heating element and of the material tube 102, a press fit should be formed. As a result, a good thermal coupling is achieved with at the same time easy assembly. For this purpose, the coefficient of thermal expansion of the material tube 102 should be greater than the coefficient of thermal expansion of the heating element 1, in particular of its sleeve-shaped carrier element.

It can also be seen that a housing 103 consisting of a housing head 105 and a housing shaft 106 is provided. Incorporated in the housing head 105 is a clearance 104 in the form of a lateral longitudinal slit, which is formed as open in the direction of the connection device 30.

In the exploded representation shown, the material tube 102 with the heating element 1 has been pulled out from the housing shaft 106. Furthermore, the heating element 1 has not been pushed completely onto the material tube 102.

The injection-moulding nozzle 100 is correctly assembled when the heating element 1 is pushed in the longitudinal direction L in the direction of the housing head 105, so that the connection device 30 protruding transversely in relation to the longitudinal direction is arranged within the lateral clearance 104 in the housing head 105. Furthermore, the housing shaft 106 should be pushed in the longitudinal direction L in the direction of the housing head 105, until the two butt against one another with opposite flange peripheries. The housing shaft 106 and the housing head 105 are subsequently fixed to one another with screws 107. The material tube 102 and the heating element 1 then lie substantially within the housing 103.

Such an injection-moulding nozzle may be connected either to a central machine nozzle or to a manifold plate, in particular with the housing head 105. With the other end, the housing shaft 106 and the material tube 102 then protrude into a gate of a mould plate, in which a cavity for the forming of a component is formed (also referred to as mould impression).

The invention is not restricted to one of the embodiments described above but can be modified in various ways.

For instance, it is possible in particular to connect an earthing conductor of the connection cable 40 in an electrically conducting manner to the receiving sleeve 60. In particular, the earthing conductor of the connection cable 40 may be led out between the two sleeve portions 71, 72 and fixed in an electrically conducting manner, in particular lasered on, on the outer side of one of the sleeve portions 71, 72.

Also conceivable is the use (not shown any further) of the heating element 1 in a mould impression (likewise not shown) of an injection-moulding tool, in order for example to heat a portion of the wall of the mould impression.

All of the features and advantages that are disclosed by the claims, the description and the drawing, including structural design details, spatial arrangements and method steps, may be essential to the invention both on their own and in the widest variety of combinations.

Additional Description

With reference to the figures, further embodiments are discussed:

Embodiment 1 is a heating element (1) for heating a flow channel or a mould impression that has a carrier element (10), which carries a heating conductor (20) with a first connection pin (21) and a second connection pin (22), and that comprises a connection device (30) with an electrical connection cable (40) with a first and a second conductor (41, 42), wherein the first and second connection pins (21, 22) end in an insulator (50) of the connection device (30) that separates the first connection pin (21) electrically from the second connection pin (22), wherein the insulator (50) is arranged at least in certain portions in a receiving sleeve (60) of the connection device (30), and wherein the receiving sleeve (60) points with a first end (61) in the direction of the carrier element (10), is fixed with the first end (61) on the carrier element (10) and fixes the insulator (50) in relation to the carrier element (10), characterized in that a first crimping sleeve (44) is fixed on the first connection pin (21) and a second crimping sleeve (45) is fixed on the second connection pin (22), in each case by plastic deformation, and the first crimping sleeve (44) is fixed on the first conductor (41) and the second crimping sleeve (45) is fixed on the second conductor (42), in each case by plastic deformation.

Embodiment 2 is the heating element (1) according to Embodiment 1, characterized in that the receiving sleeve (60) has a second end (62), which is opposite from the first end (61), forms a third crimping sleeve (63) and is fixed on the connection cable (40) by plastic deformation.

Embodiment 3 is the heating element (1) according to either of Embodiment 1 and Embodiment 2, characterized in that the carrier element (10) is in the form of a tube or sleeve.

Embodiment 4 is the heating element (1) according to any of Embodiment 1 to Embodiment 3, characterized in that the first end (61) of the receiving sleeve (60) reaches around the insulator (50) and has at this first end (61) two feet (64, 65) pointing outwards opposite from one another and fastened to the carrier element (10).

Embodiment 5 is the heating element (1) according to any of Embodiment 1 to Embodiment 4, characterized in that the feet (64, 65) are adapted to the outer contour of the insulator (50) such that they follow the outer contour.

Embodiment 6 is the heating element (1) according to any of Embodiment 1 to Embodiment 5, characterized in that the heating conductor (20) is applied to the carrier element (10) by film technology.

Embodiment 7 is the heating element (1) according to any of Embodiment 1 to Embodiment 6, characterized in that the receiving sleeve (60) consists of metal.

Embodiment 8 is the heating element (1) according to any of Embodiment 1 to Embodiment 7, characterized in that the insulator (50) has a neck portion (51) and a base portion (52), wherein the receiving sleeve (60) is supported on the base portion (52) of the insulator (50).

Embodiment 9 is the heating element (1) according to any of Embodiment 1 to Embodiment 8, characterized in that an earthing conductor of the connection cable (40) is connected in an electrically conducting manner to the receiving sleeve (60).

Embodiment 10 is the heating element (1) according to any of Embodiment 1 to Embodiment 9, characterized in that the insulator (50) has two through-holes (53, 54), wherein one of the first and second crimping sleeves (44, 45) is arranged in each through-hole (53, 54).

Embodiment 11 is the heating element (1) according to Embodiment 10, characterized in that the through-holes (53, 54) are respectively formed by a first, a second and a third portion (A1, A2, A3), which have at least two different diameters.

Embodiment 12 is the heating element (1) according to Embodiment 11, characterized in that the first portion (A1) is arranged on the side of the carrier element (10) and has a greater diameter than the second portion (A2), which lies between the first and third portions (A1, A3), and in that the third portion (A3) has a greater diameter than the second portion (A2), wherein the plastic deformations of the crimping sleeves (44, 45) in the region of the connection pins (21, 22) lie within the first portion (A1), a middle region of the crimping sleeves (44, 45) without plastic deformation is arranged in the region of the second portion (A2), and the plastic deformations of the crimping sleeves (44, 45) in the region of the conductors (41, 42) lie within the third portion (A3).

Embodiment 13 is the heating element (1) according to any of Embodiment 1 to Embodiment 12, characterized in that the insulator (50) is formed in two parts, comprising a standing element (55), which stands on the carrier element (10), and a head element (56), which is positioned adjacent to the standing element (55) on the side opposite from the carrier element (10).

Embodiment 14 is the heating element (1) according to any of Embodiment 1 to Embodiment 13, characterized in that the insulator (50) terminates with the crimping sleeves (44, 45) or protrudes beyond them.

Embodiment 15 is the heating element (1) according to any of Embodiment 1 to Embodiment 14, characterized in that the receiving sleeve (60) consists of a first and a second sleeve portion (71, 72), which are welded to one another, wherein the first sleeve portion (71, 72) forms the first end (61) of the receiving sleeve (60).

Embodiment 16 is an injection-moulding nozzle (100) with a flow channel (101) in a material tube (102), and with a heating element (1) according to any of Embodiment 1 to Embodiment 15 which for heating the flow channel (101) is thermally coupled to the material tube (102).

Embodiment 17 is the injection-moulding nozzle (100) of Embodiment 16, further comprising a housing (103) consisting of a housing head (105) and a housing shaft (106), wherein the connection device (30) is arranged within a lateral clearance (104) in the housing head (105).

Embodiment 18 is the injection-moulding nozzle (100) of Embodiment 17, wherein the lateral clearance (104) is a lateral longitudinal slit.

LIST OF DESIGNATIONS

1 Heating element
10 Carrier element
20 Heating conductor
21 First connection pin
22 Second connection pin
23 Electrically conducting thick film
24 First insulating layer
25 Second insulating layer
26 Clearance
30 Connection device
40 Connection cable
41 First conductor
42 Second conductor
44 First crimping sleeve
45 Second crimping sleeve
46 Protective jacket
47 Inner bevel
50 Insulator
51 Neck portion
52 Base portion
53 First through-hole
54 Second through-hole
55 Standing element
56 Head element
57 Resting surface
60 Receiving sleeve
61 First end (receiving sleeve)
62 Second end (receiving sleeve)
63 Third crimping sleeve
64 First foot
65 Second foot
66 Leg portion (first foot)
67 Leg portion (second foot)
68 Resting portion (first foot)
69 Resting portion (second foot)
70 Fastening means
71 First sleeve portion
72 Second sleeve portion
80 Thermocouple
100 Injection-moulding nozzle
101 Flow channel
102 Material tube
103 Housing
104 Clearance
105 Housing head
106 Housing shaft
A1 First portion
A2 Second portion
A3 Third portion
L Longitudinal direction (carrier element)

What is claimed is:

1. A heating element for heating a flow channel or a mould cavity, comprising:
a carrier element, which carries a heating conductor with a first connection pin and a second connection pin, and
a connection device comprising:
an electrical connection cable with a first conductor and a second conductor arranged within a protective jacket,
an insulator having a neck portion and a base portion,
a receiving sleeve for the insulator, the receiving sleeve having a first end and a second end,
wherein the first and second connection pins end in the insulator of the connection device,
wherein the insulator separates the first connection pin electrically from the second connection pin,
wherein a first crimping sleeve is fixed on the first connection pin and a second crimping sleeve is fixed on the second connection pin, in each case by plastic deformation,
wherein the first crimping sleeve is fixed on the first conductor and the second crimping sleeve is fixed on the second conductor, in each case by plastic deformation,
wherein the insulator is arranged at least in sections in the receiving sleeve of the connection device, wherein the insulator has two through-holes, wherein one of the first and second crimping sleeves is arranged in each through-hole, wherein the through-holes are respectively formed by a first, a second, and a third portion, which have at least two different diameters, wherein the insulator is formed in two parts, comprising a standing element, which stands on the carrier element, and a head element, which is positioned adjacent to the standing element, wherein the standing element of the insulator stands with a resting surface of an adapted form on the carrier element, wherein the receiving sleeve pointing with a first end in the direction of the carrier element, is fixed with the first end on the carrier element and fixes the insulator in relation to the carrier element, and wherein the second end of the receiving sleeve forms a third crimping sleeve being fixed on the protective jacket of the electrical connection cable by plastic deformation.

2. The heating element according to claim 1, characterized in that the carrier element is in the form of a tube or sleeve.

3. The heating element according to claim 1, characterized in that the first end of the receiving sleeve reaches around the insulator and has at this first end two feet pointing outwards opposite from one another and fastened to the carrier element.

4. The heating element according to claim 3, characterized in that the feet are adapted to an outer contour of the insulator such that they follow the outer contour.

5. The heating element according to claim 1, characterized in that the heating conductor is applied to the carrier element by film technology.

6. The heating element according to claim 1, characterized in that the receiving sleeve consists of metal.

7. The heating element according to claim 1, wherein the receiving sleeve is supported on the base portion of the insulator.

8. The heating element according to claim 1, characterized in that an earthing conductor of the connection cable is connected in an electrically conducting manner to the receiving sleeve.

9. The heating element according to claim 1, characterized in that the first portion is arranged on the side of the carrier element and has a greater diameter than the second portion, which lies between the first and third portions, and in that the third portion has a greater diameter than the second portion, wherein the plastic deformations of the crimping sleeves in the region of the connection pins lie within the first portion, a middle region of the crimping sleeves without plastic deformation is arranged in the region of the second portion, and the plastic deformations of the crimping sleeves in the region of the conductors lie within the third portion.

10. The heating element according to claim 1, characterized in that the insulator is formed in two parts, comprising a standing element, which stands on the carrier element, and a head element, which is positioned adjacent to the standing element on the side opposite from the carrier element.

11. The heating element according to claim 1, characterized in that the insulator terminates with the crimping sleeves or protrudes beyond them.

12. The heating element according to claim 1, characterized in that the receiving sleeve consists of a first sleeve portion and a second sleeve portion, which are welded to one another, wherein the first sleeve portion forms the first end of the receiving sleeve.

* * * * *